Sept. 19, 1933.   R. A. SKINNER   1,927,188

ONE-PIECE METAL COVER FOR VEHICLE SPRINGS AND METHOD OF MAKING THE SAME

Filed March 8, 1930

Inventor
ROBERT A. SKINNER
Attorney
A. D. T. Libby

Patented Sept. 19, 1933

1,927,188

UNITED STATES PATENT OFFICE 1,927,188

ONE-PIECE METAL COVER FOR VEHICLE SPRINGS AND METHOD OF MAKING THE SAME

Robert A. Skinner, New York, N. Y., assignor to Briggs & Stratton Corp., Milwaukee, Wis., a corporation of Delaware Application March 8, 1930. Serial No. 434,394

3 Claims. (Cl. 153—1)

This invention relates to metal covers particularly for the springs of automotive vehicles, and has as an object the provision of a metal cover made from a single blank so cut and folded as to enable ready application to the spring.

It is another object of my invention to provide a spring cover of unitary construction to insure a neat appearance.

With the above and other objects in view which will appear as the description proceeds, my invention resides in the novel construction, combination and arrangement of parts substantially as hereinafter described and more particularly defined by the appended claims, it being understood that such changes in the precise embodiment of the hereindisclosed invention may be made as come within the scope of the claims.

In the accompanying drawing, I have illustrated one complete example of the physical embodiment of my invention constructed according to the best mode I have so far devised for the practical application of the principles thereof, and in which:—

Figure 1:
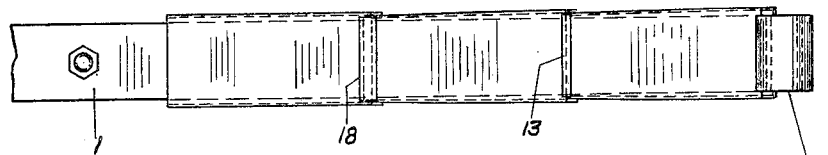
Figure 1 is a top plan view of one-half of a spring, with my spring cover in position.

Referring now to the drawing wherein like numbers refer to corresponding parts in the various views, 1 indicates a multiple-leaf spring which is shown being held together by bolt 2, it being understood that the spring is held to the axle by the usual U bolts. The upper or inner leaf of the spring 1 is formed with an eye 3 to receive a shackle bolt bushing 4.

My improved form of spring cover is made from one piece or strip of sheet metal of suitable kind, which may be sheared from strip stock or preferably blanked therefrom. The strip 5 is slitted transversely at a plurality of points from its opposite edges on the lines 6 and 7 up to the points 8 and 9, thereby leaving a central portion extending longitudinally and continuously throughout the length of the strip. At the inner ends of the slits 6 and 7, as indicated by the numerals 8 and 9, the metal is provided with short longitudinal slits 10 and 11 extending in the same direction.

After the slitting has been performed as above indicated, the metal between the slits 10 and 11 is projected outwardly or folded up along the line 12, so as to form projections 13. When the projections 13 are thus formed, the centrally-located portion heretofore referred to is shortened and this brings, what I term the edge sections, defined by the slits 6 and 7, into overlapping relationship, it being understood that when the slits 6 and 7 are made, the ends of one of the sections produced by the slitting operation, are displaced a slight amount so that when the projections 13 are formed, the ends of these sections 14 will pass into overlapping relationship, as indicated by the dotted line 15 in Figure 2.

Figure 2:
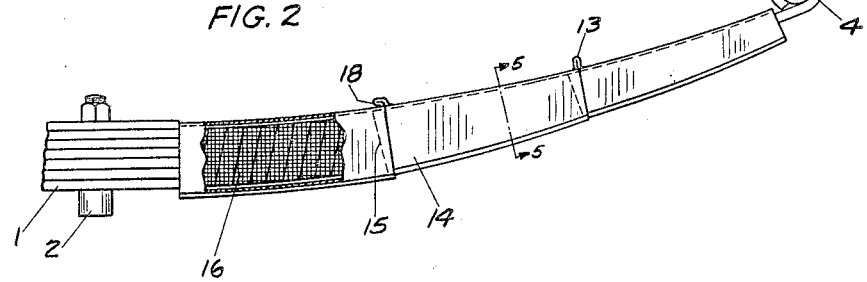
Figure 2 is a side elevation of Figure 1, a small portion of the spring cover being broken away to show the method of assembly on the spring.
Figure 5:
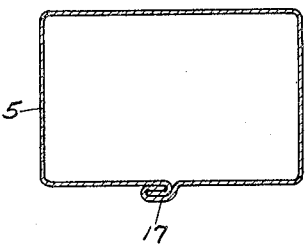
Figure 5 is a section on the line 5—5 of Figure 2, but somewhat enlarged and without the leaves of the spring being shown.
Figure 3:
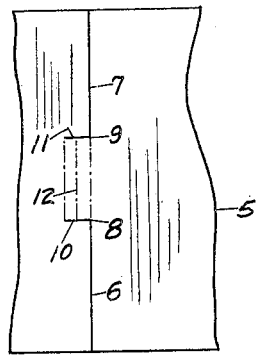
Figure 3 is a fragmentary plan view of a portion of the spring cover blank before any forming operations are performed.
Figure 4:
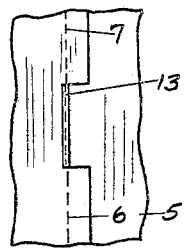
Figure 4 is a view similar to Figure 3 after one of the forming operations has been completed.

After this operation has been performed, the edge sections 14 are then bent over so as to engage the edges of the spring, the bending operation being continued after the cover has been placed on the spring as shown in Figure 2.

Before placing the cover on the spring, it is preferable to cover the springs with lubricant such as graphite, and then apply a wrapping 16 of suitable material such as burlap so that after the cover 5 has been put into position and secured as will now be described, the lubricant is retained within the wrapping and the spring is kept in condition to work at its highest efficiency.

After the side sections have been bent so as to engage the edges of the spring, they are applied to the spring and the free edges are bent over the sides of the spring and these edges turned into interlocking relationship, as indicated at 17. This operation is performed by a suitable tool which draws the sections of the cover securely around the spring. At the same time, or as a subsequent operation, the projections 13 may be bent or flattened over as indicated at 18 so as to give as smooth a surface as possible on the upper side of the spring.

Preferably the construction herein described and claimed is applied to the spring before it is put on the vehicle, as it can then be done very expeditiously and produces a very neat and workmanlike job.

Having thus described my invention, what I claim is:

1. The method of making and applying a one-piece metal cover for and to a vehicle spring, which consists in preparing a strip of metal to suitable length and width, then slitting it transversely at a plurality of opposite points on opposite edges, leaving a central longitudinal unslitted portion, at the same time slitting the metal longitudinally in the same direction for a short distance at the end of each transverse slit and slightly displacing opposite sections from their adjacent sections, then forcing the metal between said longitudinal slits outwardly, thereby drawing the metal of said central portion together in sections and causing said edge sections to overlap, then bending said overlapped sections over to cover the edges of the springs, then placing the cover over the spring, and continuing the bending operation to the other side of the spring, and finally interlocking the free edges of said sections.

2. The method of making and applying a one-piece metal cover for and to a vehicle spring which consists in preparing a strip of metal to suitable length and width, then slitting it transversely at a plurality of opposite points on opposite edges, leaving a central longitudinal unslitted portion, at the same time slitting the metal longitudinally in the same direction for a short distance at the end of each transverse slit and slightly displacing opposite sections from their adjacent sections, then folding up the metal between said longitudinal slits thereby forming transverse projections across the central portion and drawing said edge sections into overlapping relationship, then forming said overlapping sections at right angles to the central portion to form the sides of the cover, placing the cover on the spring so said central portion lies on one side of the spring and continuing the bending operation so the free edges meet, interlocking said free edges and bending over said projections on said central portion.

3. A cover for a vehicle spring comprising a single sheet of metal embracing the two sides and both edges of the spring, the sheet having L-shaped slits cut therein from its opposite sides with one leg of each L-shaped slit extending transversely in from the adjacent side edge of the sheet and the other leg thereof being parallel to the longitudinal axis of the sheet, the metal of the sheet in the unslitted part between the longitudinal legs of the slits being folded up, whereby the sections into which the sheet is divided by the L-shaped slits are brought into overlapping relationship, and an interlocking connection of the side edges of the sheet to hold the cover on the spring.

ROBERT A. SKINNER.